June 25, 1940.  W. C. NABORS  2,205,575
TRUCK BODY
Filed Dec. 19, 1938  3 Sheets-Sheet 1

Inventor
WILLIAM C. NABORS
E. V. Hardway
Attorney

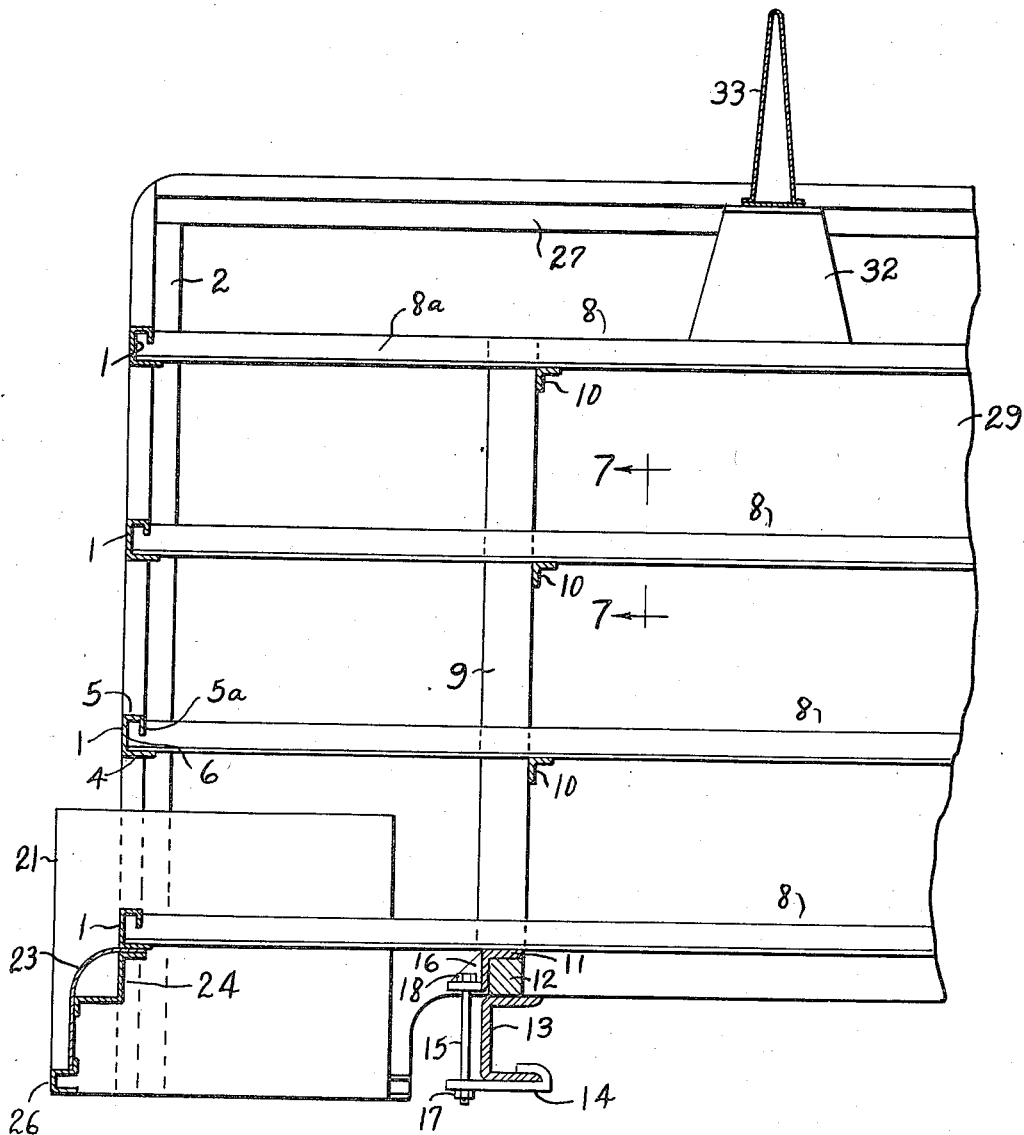

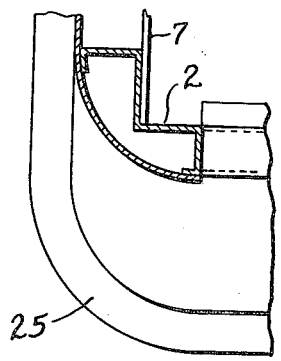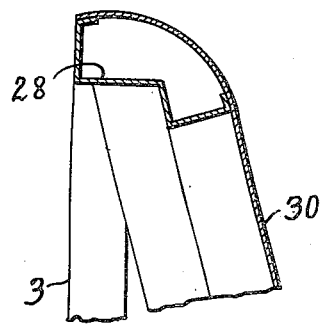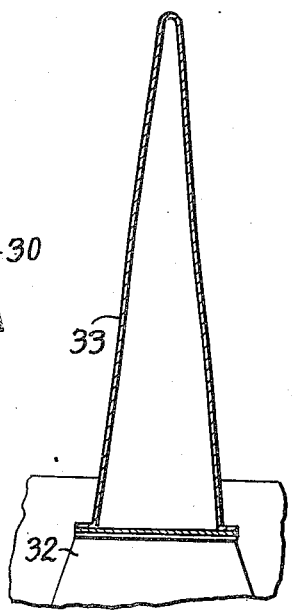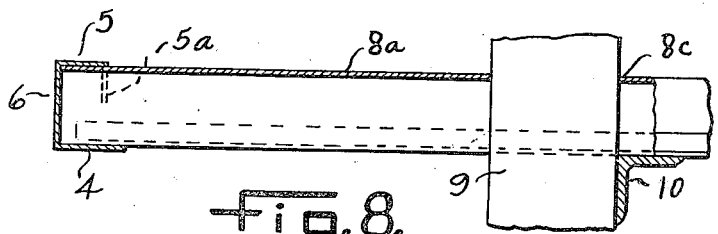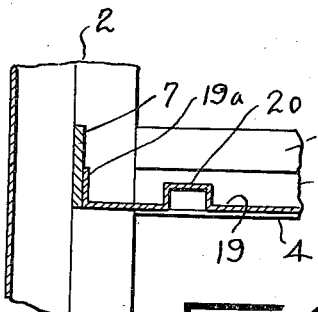

Patented June 25, 1940

2,205,575

UNITED STATES PATENT OFFICE 2,205,575

TRUCK BODY

William C. Nabors, Mansfield, La.

Application December 19, 1938, Serial No. 246,541

4 Claims. (Cl. 296—3)

This invention relates to a truck body.

An object of the invention is to provide a truck body specially designed for transporting cases of bottled goods such as soft drinks and the like although it is capable of other uses and the invention embodies a skeleton framework whose parts are so united together as to provide a very light but strong and durable structure.

Another object of the invention is to provide a vehicle having a plurality of decks one above the other each deck embodying side rails, end rails and flooring combined in a novel manner to form a very light but strong and durable support for the cases of bottled goods to be transported to the end that the body will have a maximum capacity for transporting goods with a mimimum of weight.

The invention also embodies a novel framework construction including transverse spacer rails whose ends are supported by the side rails of the body with intermediate, vertical supporting standards extending through the spacer rails and securely anchored thereto to give the necessary strength to the load supporting structure.

With the above and other objects in view the invention has particular relation to certain novel features of construction, arrangement of parts and use, an example of which is given in this specification and illustrated in the accompanying drawings, wherein:

Figure 3 shows an enlarged, fragmentary, vertical, sectional view taken on the line 3—3 of Figure 1.

Figure 4 shows an enlarged, fragmentary, horizontal, sectional view taken on the line 4—4 of Figure 1.

Figure 5 shows an enlarged, fragmentary, horizontal, sectional view taken on the line 5—5 of Figure 2.

Figure 6 shows an enlarged, fragmentary, vertical, sectional view taken on the line 6—6 of Figure 1.

Figure 7 shows an enlarged, fragmentary, vertical, sectional view taken on the line 7—7 of Figure 3.

Figure 8 shows an enlarged, fragmentary, vertical, sectional view taken on the line 8—8 of Figure 7, and Figure 9 shows an enlarged, fragmentary, sectional view taken on the line 9—9 of Figure 2.

Figures 1, 2:
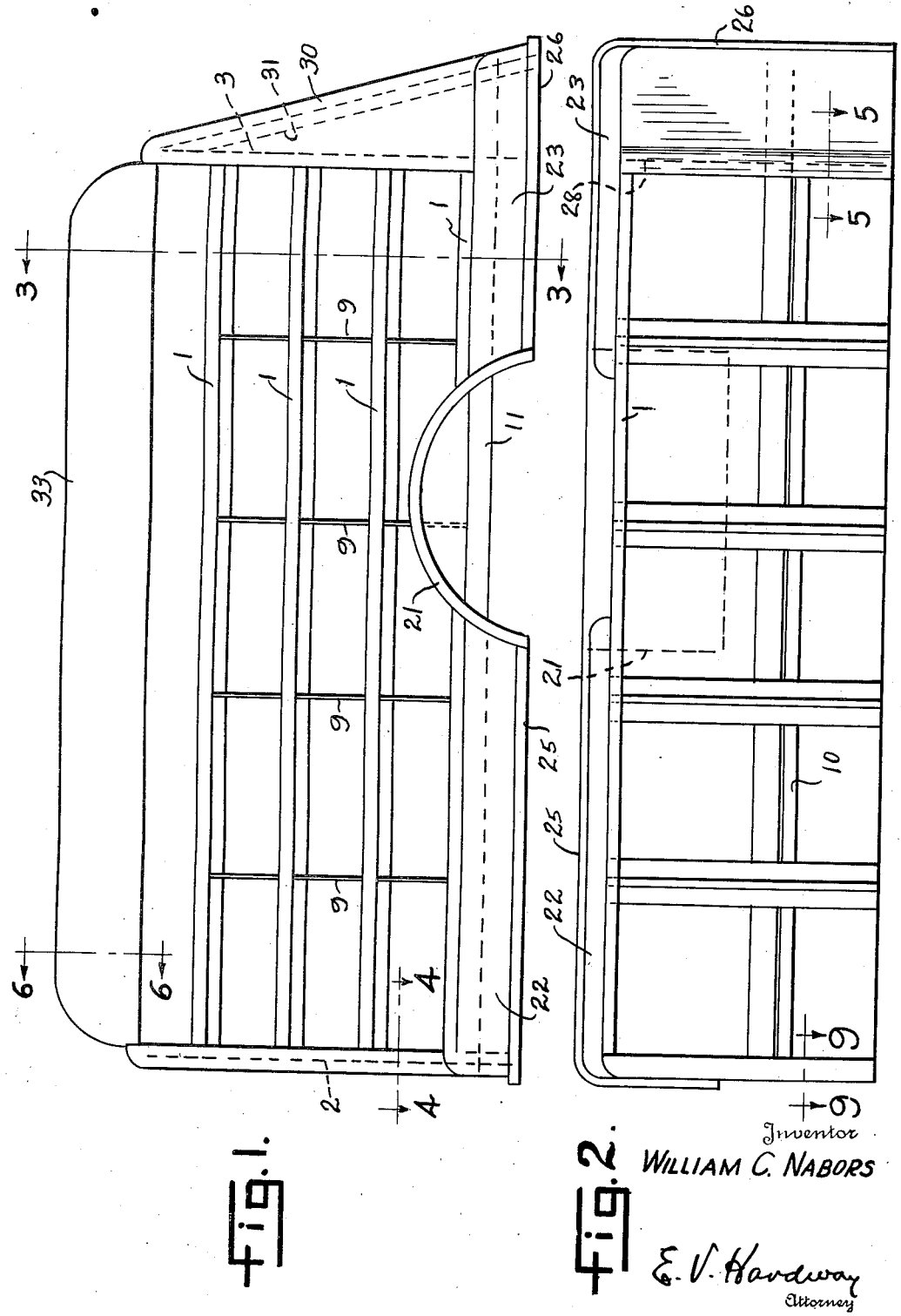
Figure 1 shows a side elevation of the complete body.
Figure 2 shows a plan view, showing the right side of the skeleton framework.

Referring now more particularly to the drawings wherein like numerals of references designate the same parts in each of the figures, the numerals 1, 1 designate the side rails arranged in pairs, one on each side of the body. As illustrated in Figure 3 there are four pairs of side rails. At their ends these side rails are anchored to the front and rear corner posts 2, 2, 3, 3. A preferred form of side rail has the inwardly extending bottom flange 4, arranged horizontally and the inwardly extending top flange 5 extending horizontally and whose inner margin 5a is downwardly turned, said top and bottom flanges being connected by the vertical web 6 as is also more accurately shown in Figure 8. Connected to the front corner posts opposite, and in alignment with the respective side rails are the end rails 7 which are preferably formed of flat bars and similar rear end rails are attached, at their respective ends, to the rear corner posts 3 and in alignment with the corresponding pairs of side rails.

Extending transversely of the body are the spacer rails 8. A preferred form of spacer rail is shown in Figures 7 and 8. It is formed of relatively thin, strong metal T-shaped in cross-section with its central leg 8a extending upwardly from the horizontal head flanges 8b, 8b. The ends of these spacer rails rest on the inwardly extended bottom flanges 4 of the corresponding side rails and the downwardly turned margins 5a of the side rails are notched to receive the upper margins of the legs 8a of the spacer rails, as shown in Figure 8.

As clearly shown in Figure 7 the spacer rails 8 are formed so that the legs 8a will be of an inverted U-shaped form and the supporting standards 9 extend up through said legs 8a, openings as 8c being provided for that purpose. As illustrated in Figure 1, each deck framework has a plurality or series of spacer rails 8, four being shown in each series although more or less may be used depending on the size of the body and the spacer rails of each series are vertically aligned with the corresponding rails of the other series. As illustrated, there are two vertical standards 9 for each vertically aligned series of spacer rails 8. These standards extend through the spacer rails except the top one and the crowns of the upper series of legs 8a rest on the upper ends of the corresponding standards as illustrated in Figure 3.

The series of transverse spacer rails, except the bottom series, are securely anchored to the standards 9 and to the longitudinally extending angle irons 10 which are fitted into the angles between said standards and spacer rails and welded thereto. The standards 9 are supported on the longitudinally extending angle irons 11, 11. These angle irons have their top flanges extending horizontally to provide firm supports for the lower ends of the standards with their side flanges depending from the horizontal top flanges as illustrated in Figure 3 and these angle irons 11 are supported by the longitudinal timbers 12 upon which they fit, said angle irons 11 and timbers 12 forming sills for the body.

The sills are aligned above the corresponding side members 13 of the vehicle. These side members are commonly channel irons with their flanges extending horizontally inwardly. Suitable clamp hooks as 14 may be engaged over the free margins of the lower flanges of said side members with clamp bolts as 15 fitted through the other ends of said clamp hooks. The vertical side flanges of the angle irons 11 are provided with brackets as 16 having bearings to receive the corresponding bolts 15. Each bolt 15 is provided with a head at one end to engage the clamp hook and is threaded at its other end to receive a clamp nut 18 thus providing convenient means for anchoring, or securing, the truck body to the vehicle framework. However, any suitable means for anchoring the body to the vehicle framework may be employed since this forms no part of the present invention. Each deck embodies also flooring formed of sheets 19. These sheets extend transversely of the body between the spacer rails and between the front and rear spacer rails and the front and rear end rails 7 with their ends overlapping and resting on the adjacent flanges 4. As will be noted from an inspection of Figure 7 the margins of the sheets 19 overlap the corresponding head flanges 8b of the spacer rails 8. The margins of the floor sheets at the front and rear of the body are upwardly turned forming flanges as 19a which are fitted against the corresponding transverse bars or rails 7 and welded thereto. The lower faces of the floor sheets are connected to the longitudinal angle irons 10. The floor sheets have suitable spaced, upstanding corrugations, or ribs, 20 extending from side to side of the body. The floor sheets are thus supported at their ends intermediate the ends, and at their side margins and are amply reinforced and strengthened by the transverse corrugations 20 so as to readily support the bottle cases and yet to provide a very light and durable construction.

On opposite sides of the body are the fenders 21 for the vehicle wheels, an intermediate portion of the lower side rails 1, 1 being cut away to provide the required space therefor and in front of and behind each fender are the longitudinally extended, outwardly curved metal sheets 22, 23 supported and reinforced by the longitudinally extended angle bars 24. The upper margin of the sheets 22, 23 are fitted underneath the corresponding side rails 1, and their lower margins are reinforced by the channel strips 25, 26. All of these adjacent parts are securely welded together and the ends of the sheets 22, 23 as well as the ends of the angle irons 24 and finish-channels 25, 26 which are adjacent the fenders 21 are securely welded thereto. The forward end of the finishing strips 25 are continued on around the forward end of the body, as shown in Figure 2, and are welded to said forward end while the channel strip 26 is continuous, extending entirely around the rear end of the truck body and forwardly to the fender on the other side.

The upper ends of the front posts 2 are connected by the front cross-bar 27 and the upper ends of the rear posts 3 are connected by the cross-bar 28. The front end of the body is formed of a sheet 29 whose side margins and top margins are curved rearwardly around the corner posts 2 and the top cross-bar 27 as shown in Figures 1, 2 and 3. The rear end of the body is enclosed by a downwardly and rearwardly widened skirt 30 whose upper margin overlies the rear cross-bar 28, as shown in Figure 5, and whose lower margin is surrounded, reinforced and braced by the channel strip 26. This skirt is suitably reinforced and strengthened by reinforcing as 31.

Upstanding from the top rails 7, at the front and rear are the brackets as 32 to the upper ends of which the front and rear ends of the longitudinal display board 33 are secured. This display board is of an inverted V-shape in cross-section as shown in Figures 3 and 6, its sides providing suitable display surfaces and it also serves to tie the front and rear ends of the framework together and to strengthen the structure.

The adjacent parts of the body framework are preferably welded together, although they may be secured together in any preferred manner. The floor sheets 19 may be made removable or, if desired, they may be welded to the adjacent parts of the structure.

What I claim is:

1. A truck body comprising end frames at each end thereof including corner posts, side and end rails connected to the corner posts, said side rails being channel shaped and having upper and lower inwardly extending flanges, the inner margins of the upper flanges being downwardly turned and formed with notches, transverse spacer rails arranged in series the rails of each series being in vertical alignment, said spacer rails having laterally extending head flanges and upstanding legs, the ends of said spacer rails resting on the lower side rail flanges and the legs extending into the corresponding notches, standards upstanding adjacent the respective series of spacer rails and on which said spacer rails are supported, means for supporting said standards, floor sheets between the spacer rails and between the end spacer rails and the end rails the margins of the floor sheets being supported by the adjacent rails, said end frames being effective to prevent endwise movement of the side rails, and the co-acting notches and spacer legs preventing movement of the spacers relative to the side rails.

2. A truck body comprising corner posts, side and end rails connected to the corner posts, said side rails being channel shaped and having upper and lower inwardly extending flanges with the inner margin of the upper flanges being overturned, spacer rails whose ends rest on the corresponding lower rail flanges, said overturned margins having slots therein and the spacer rails having upstanding legs fitted in said slots and contacting the upper flanges whereby the co-acting slots and legs prevent movement of the spacer rails along the side rails, said spacer rails having laterally extended head flanges seated on the lower flanges, floor sheets whose ends are supported on the lower flanges of the respective side rails, whose margins adjacent the spacer rails overlap the head flanges thereof and whose margins adjacent the end rails are overturned and secured thereto.

3. A truck body comprising corner posts, side and end rails connected to the corner posts, said side rails being channel shaped having upper and lower inwardly extending flanges with the inner margins of the upper flanges being overturned, transverse T-shaped spacer rails whose ends seat on the corresponding lower rail flanges, each of said spacer rails comprising upstanding, parallel, spaced legs connected together at the upper margins by a cross-web, and laterally extending head flanges which are welded to the horizontal portions of the side rails at the ends of the spacer rails, said overturned margins having slots therein into which the upstanding legs of the spacer rails are positioned and in abutting relationship with the upper flanges of said side rails whereby the co-acting slots and legs prevent movement of the spacer rails along the side rails, said spacer rails being arranged in vertically aligned series and having vertically aligned holes in the cross-webs which connect the vertical legs, and standards extending through said holes and in abutting relationship with the vertical legs of the spacer rails.

4. An end construction for a truck body comprising a vertically disposed metal sheet whose ends are rounded, vertical members attached to each of said ends, each member having a central right angled portion formed of sides which are respectively parallel and perpendicular to the plane of said metal sheet, and end legs reversely pitched at right angles to said sides and which are secured to said end, horizontal members connected to the sides of the central angled portion of said vertical members which are parallel to the metal sheet and to which a flooring for a shelf may be attached, the vertical members thereby forming posts, and the metal sheet forming diagonal and transverse bracing for the vertical members.

WILLIAM C. NABORS.